US008254267B2

(12) United States Patent
Srivatsan et al.

(10) Patent No.: US 8,254,267 B2
(45) Date of Patent: Aug. 28, 2012

(54) EXTENSIBLE TRAFFIC GENERATOR FOR SYNTHESIS OF NETWORK DATA TRAFFIC

(75) Inventors: D Srivatsan, Bangalore (IN); Vinoj N. Kumar, Austin, TX (US); Kaushik Nath, Bangalore (IN); Srinivasan Rangarajan, Bangalore (IN); Chandramouleeswaran Sankaran, Bangalore (IN)

(73) Assignee: Agere Systems Inc., Allentown, PA (US)

( * ) Notice: Subject to any disclaimer, the term of this patent is extended or adjusted under 35 U.S.C. 154(b) by 3079 days.

(21) Appl. No.: 10/620,044

(22) Filed: Jul. 15, 2003

(65) Prior Publication Data

US 2005/0025054 A1 Feb. 3, 2005

(51) Int. Cl.
*H04L 12/26* (2006.01)
(52) U.S. Cl. .................... 370/241; 714/738
(58) Field of Classification Search .......... 370/229, 370/230, 230.1, 231, 232, 351, 352, 353, 370/233, 234, 252, 253, 241, 247, 248; 709/238, 709/239, 240, 241
See application file for complete search history.

(56) References Cited

U.S. PATENT DOCUMENTS

| | | | | |
|---|---|---|---|---|
| 6,028,847 A * | 2/2000 | Beanland | | 370/252 |
| 6,067,286 A * | 5/2000 | Jones et al. | | 370/218 |
| 6,208,643 B1 * | 3/2001 | Dieterich et al. | | 370/389 |
| 6,262,976 B1 * | 7/2001 | McNamara | | 370/254 |
| 6,487,212 B1 * | 11/2002 | Erimli et al. | | 370/230 |
| 6,498,667 B1 * | 12/2002 | Masucci et al. | | 370/230 |
| 6,636,527 B1 * | 10/2003 | Lee et al. | | 370/465 |
| 6,778,495 B1 * | 8/2004 | Blair | | 370/230 |
| 7,065,036 B1 * | 6/2006 | Ryan | | 370/208 |
| 2002/0089929 A1 * | 7/2002 | Tallegas et al. | | 370/230 |
| 2002/0129158 A1 * | 9/2002 | Zhang et al. | | 370/230 |
| 2003/0012141 A1 * | 1/2003 | Gerrevink | | 370/250 |

OTHER PUBLICATIONS

W.E. Leland, "On the Self-Similar Nature of Ethernet Traffic," IEEE/ACM Transactions on Networking, pp. 1-46, Feb. 1994.
R. Bhattacharya et al., "Design of 160 Gbps Router with PI40 Switch Fabric and 10G Chipsets," Proceedings of the International Conference on Communications and Broadband Networking, ICBN '03, May 5-7, 2003, Bangalore, India, 4 pages, 2003.
D. Turner et al., "Protocol-Dependent Message-Passing Performance on Linux Clusters," 2002 IEEE International Conference on Cluster Computing (CLUSTER 2002), Chicago, IL, USA, pp. 187-194, Sep. 23-26, 2002.
NetPIPE, http://www.scl.ameslab.gov/netpipe/, pp. 1-2, May 2003.
"Welcome to the Public Netperf Homepage," http://www.netperf.org/netperf/NetperfPage.html, 1 page, Nov. 2003.
TTCP Utility, "Test TCP (TTCP) Benchmarking Tool for Measuring TCP and UDP Performance," http://www.pcausa.com/Utilities/pcat-tcp.htm, pp. 1-5, Feb. 2003.

* cited by examiner

*Primary Examiner* — Pao Sinkantarakorn
(74) *Attorney, Agent, or Firm* — Ryan, Mason & Lewis, LLP

(57) ABSTRACT

A traffic generator generates a plurality of traffic flows, with each of the traffic flows being associatable with one or more of a plurality of output interfaces of the traffic generator. In an illustrative embodiment, each of the output interfaces may have any desired combination of the traffic flows associated therewith. The traffic flows may be generated based on user selection of at least one of a protocol encapsulation, a packet size distribution model, a packet arrival time distribution model, a traffic model, and a packet payload description. Information characterizing one or more of the traffic flows may be stored as a traffic file in a memory associated with the traffic generator.

19 Claims, 3 Drawing Sheets

FIG. 3A

```
-----------------------------------------------------------
| GLOBAL HEADER || FRAME HEADER | FRAME || FRAME HEADER |
-----------------------------------------------------------
| FRAME || FRAME HEADER | FRAME || ···
-----------------------------------------------------------
```

FIG. 3B

```
------------------------------------
| TYPE || CLOCK SPEED || RESERVED |
------------------------------------
```

FIG. 3C

```
-------------------------------------------
| FLOW ID | DELTA | LENGTH | RESERVED |
-------------------------------------------
```

EXTENSIBLE TRAFFIC GENERATOR FOR SYNTHESIS OF NETWORK DATA TRAFFIC

RELATED APPLICATION(S)

The present invention is related to the invention described in U.S. patent application Ser. No. 10/620,258, entitled "Traffic Generator with Enhanced Burst Modeling Feature," which is filed concurrently herewith and incorporated by reference herein.

FIELD OF THE INVENTION

The present invention relates generally to communication systems, and more particularly to techniques for generating data traffic for use in testing or other processing applications in such systems.

BACKGROUND OF THE INVENTION

Traffic generators are commonly utilized in generating data traffic having characteristics suitable for testing a given communication system design. Such traffic generators may be implemented in hardware or software. Data traffic characteristics such as the time distribution of packet arrival are critical for testing communication system performance parameters such as buffering and scheduling capacity.

By way of example, high-speed network transport mechanisms such as asynchronous transfer mode (ATM) and Internet protocol (IP) are being utilized to provide new classes of communication services, including multimedia, voice and video-on-demand. In order to properly simulate the operation of network processors and other system elements typically used to support these and other services, accurate predictions of system performance under various network traffic scenarios are generally required. Traffic generators are configured to generate the data traffic for the various scenarios of interest.

It is generally desirable for a given traffic generator to provide data traffic output which closely models the "real-life" behavior of packet arrival timing in the system. For example, such behavior often involves so-called burst arrival, when a certain number of packets arrive substantially back-to-back, that is, one after another without any significant intervening time between arriving packets.

Conventional traffic generators suffer from a number of significant drawbacks. For example, the configuration flexibility of conventional generators is unduly limited. As a result, a given conventional traffic generator typically will not support a sufficiently large number of protocols, packet size distribution models, packet arrival time distribution models, parameter sequences, or other features.

Another significant drawback of conventional traffic generators is that such generators do not provide a traffic file format which allows association of different traffic flows with a single output interface.

As a result of these and other drawbacks, users are often unable to generate traffic that accurately reflects the desired network traffic scenarios.

It may therefore be necessary in a given application to utilize multiple customized traffic generators to provide the requisite data traffic, or to construct elaborate prototypes, both of which lead to excessive costs in the simulation process.

Accordingly, a need exists in the art for a traffic generator which exhibits a higher degree of configuration flexibility.

SUMMARY OF THE INVENTION

The present invention provides improved techniques for generating network data traffic utilizable in communication system testing and other applications.

In accordance with one aspect of the invention, a traffic generator generates a plurality of traffic flows, with each of the traffic flows being associatable with one or more of a plurality of output interfaces of the traffic generator. For example, in one embodiment, each of the output interfaces may have any desired combination of the traffic flows associated therewith. Each of the plurality of traffic flows preferably maps to one of the output interfaces of the traffic generator, and may also map to one of a plurality of input interfaces of the traffic generator. The traffic flows may be generated based on user selection of at least one of a protocol encapsulation, a packet size distribution model, a packet arrival time distribution model, a traffic model, and a packet payload description. The output interfaces may be associated with an output interface bus of the traffic generator, and the output interface bus may be implemented as a software module representative of one or more physical buses or other connections.

The traffic generator in an illustrative embodiment further comprises a pattern generator and a sequencer. The pattern generator preferably has a plurality of user-selectable pattern generation processes associated therewith, with each of the processes adaptable for generating a configuration list. The sequencer preferably has a plurality of user-selectable sequencing processes associated therewith, with a given one of the sequencing processes specifying an order of selection of items from a configuration list. One of the sequencing processes may comprise, for example, a group sequencer which provides a correlative mapping between two or more configuration lists and their associated parameters.

In accordance with another aspect of the invention, information characterizing one or more of the traffic flows may be stored as a traffic file in a memory associated with the traffic generator. The traffic file may be represented as a string which includes a global header followed by one or more frames each having an associated frame header.

In accordance with yet another aspect of the invention, the traffic generator may be operable in at least two phases, including a first phase in which a timestamp table is constructed based at least in part on user-selected configuration information, and a second phase in which packets are generated using the timestamp table constructed in the first phase.

A traffic generator in accordance with the invention overcomes one or more of the problems associated with the conventional traffic generators described above. For example, in the illustrative embodiment the traffic generator allows users to combine protocols, packet size and packet arrival time distribution models, parameter sequences and other features to generate a wide variety of user-customizable real-life traffic scenarios in a particularly efficient manner.

BRIEF DESCRIPTION OF THE DRAWINGS

FIGS. 3A, 3B and 3C show an example traffic file format used in the illustrative embodiment of the invention.

DETAILED DESCRIPTION OF THE INVENTION

The present invention will be illustrated herein in conjunction with an exemplary extensible traffic generator that may be implemented primarily in software and configured to generate data traffic files that are advantageously utilizable in one or more hardware traffic generators. It should be understood, however, that the techniques of the invention can be more generally applied to any type of traffic generation application. The invention does not require the particular elements of the illustrative embodiment, and other elements can be used in addition to or in place of the particular elements shown.

The term "data traffic" as used herein is intended to include any type of information traffic, including audio, video, voice, multimedia, etc. in any combination.

Figure 1:
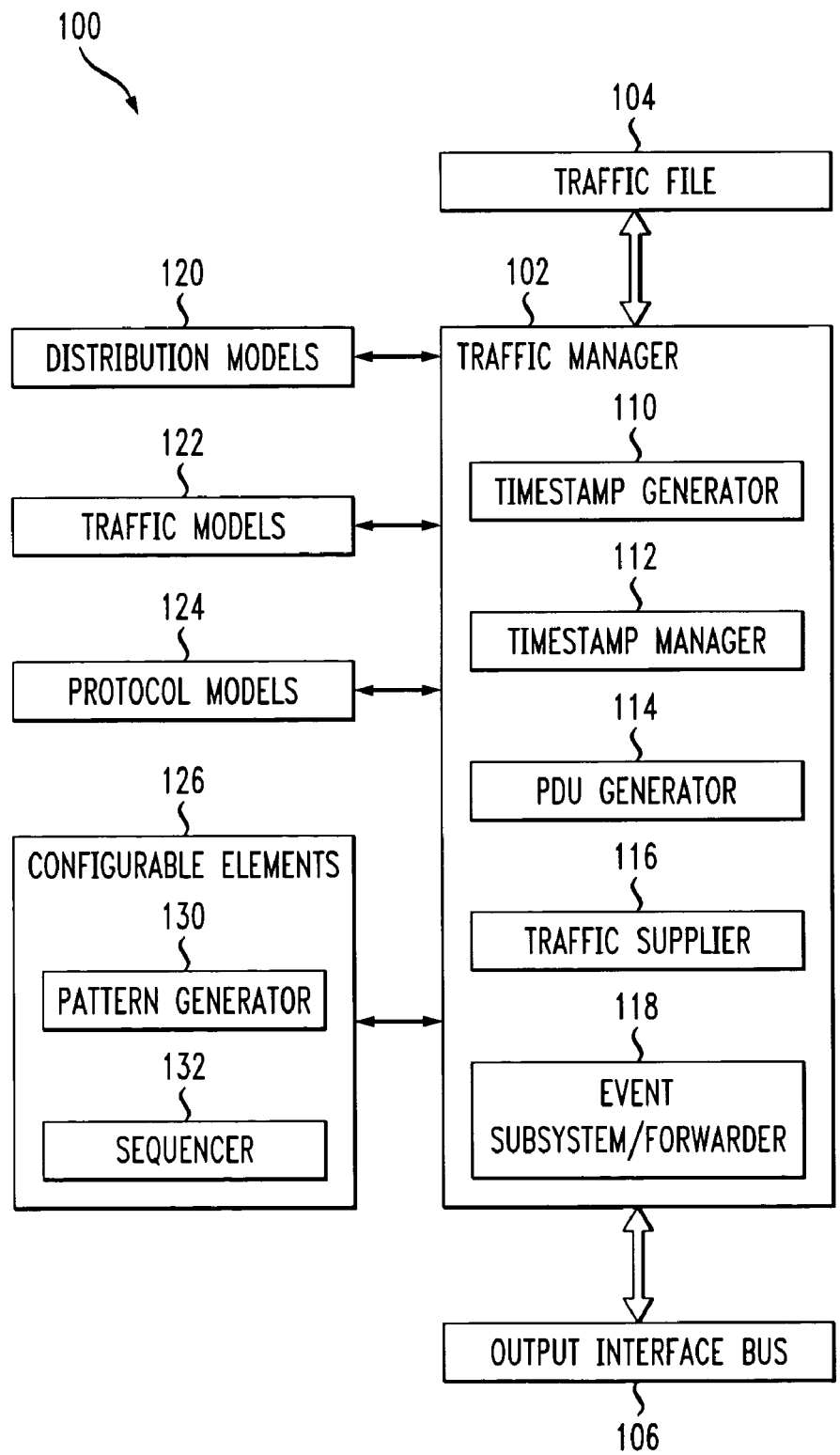
FIG. 1 shows an illustrative embodiment of a traffic generator configured in accordance with the invention.

FIG. 1 shows an illustrative embodiment of a traffic generator 100 configured in accordance with the invention. The traffic generator 100 includes a traffic manager 102, a traffic file memory 104, and an output interface bus 106.

The traffic manager 102 manages the traffic generation functions of the traffic generator 100, and includes, in this embodiment, a timestamp generator 110, a timestamp manager 112, a protocol data unit (PDU) generator 114, a traffic supplier 116, and an event subsystem and/or forwarder 118. Generated traffic patterns, parameters and other traffic-related information are stored in the traffic file memory 104. Traffic generated by the traffic generator 100 under the control of the traffic manager 102 may be delivered via output interface bus 106 to one or more devices.

In generating traffic using the techniques described herein, the traffic manager 102 may also utilize distribution models 120, traffic models 122, protocol models 124, and configurable elements 126. Examples of configurable elements include a pattern generator 130 and a sequencer 132. It should be understood, however, that any other modules or elements of the traffic generator 100 may but need not also be similarly configurable, even though not explicitly identified as being configurable in the figure.

The traffic generator 100 or other traffic generator configured in accordance with the invention can be implemented in hardware, software, firmware or any combination of these. For example, the traffic generator 100 may be viewed as a hardware traffic generator or a software traffic generator, or a combination of both. Generally, the traffic generator 100, whether implemented as a hardware traffic generator, a software traffic generator or a combination of both, may be implemented as or within an information processing device having at least one processor and at least one associated memory.

A more particular example of a software traffic generator is a software traffic generator which comprises an element of a software-based development tool for simulating the operation of interconnected integrated circuits or other types of electronic systems. Such a software-based development tool is typically configured to run at least in part on a general-purpose computer, workstation or other information processing device comprising at least one processor and an associated memory.

The traffic generator 100 is configured to execute one or more traffic generation processes, as will be described in greater detail below in conjunction with FIGS. 2 and 3. Such processes are implemented at least in part in the form of software comprising one or more programs stored in the memory of the information processing device and executed by the processor of the information processing device. The configuration and operation of such information processing devices are well-known in the art, and therefore not described in further detail herein.

It is also to be appreciated that the traffic generator 100 in the illustrative embodiment may further include, in addition to or in place of the particular modules or other elements shown in FIG. 1, additional modules and other elements of a type commonly found in conventional implementations of such traffic generators. These conventional modules and other elements, being commonly used in the art, will not be described in detail herein.

In the illustrative embodiment, the traffic generator 100 preferably comprises an extensible traffic generator that is implemented primarily in software and configured to generate data traffic files that are utilizable, by way of example, in hardware traffic generators.

The traffic generator 100 in this embodiment is referred to as "extensible" in that it provides a substantially higher degree of configuration flexibility than the previously-described conventional traffic generators. For example, the traffic generator may be used to create traffic files which provide a particularly efficient mechanism for specifying a wide variety of different types of traffic, without undue limitation as to number of protocols, size or arrival time distribution models, parameter sequences, or other features. Moreover, such traffic files, although generated primarily in software, are readily utilizable in hardware traffic generators.

The traffic generator 100 thus can serve as a flexible test bed for use in conducting system design testing, without the need for multiple customized traffic generators or the construction of elaborate prototypes.

Advantageously, the traffic generator 100 in the illustrative embodiment allows users to combine protocols, packet size and packet arrival time distribution models, parameter sequences and other features to generate a wide variety of user-customizable real-life traffic scenarios.

Figure 2:
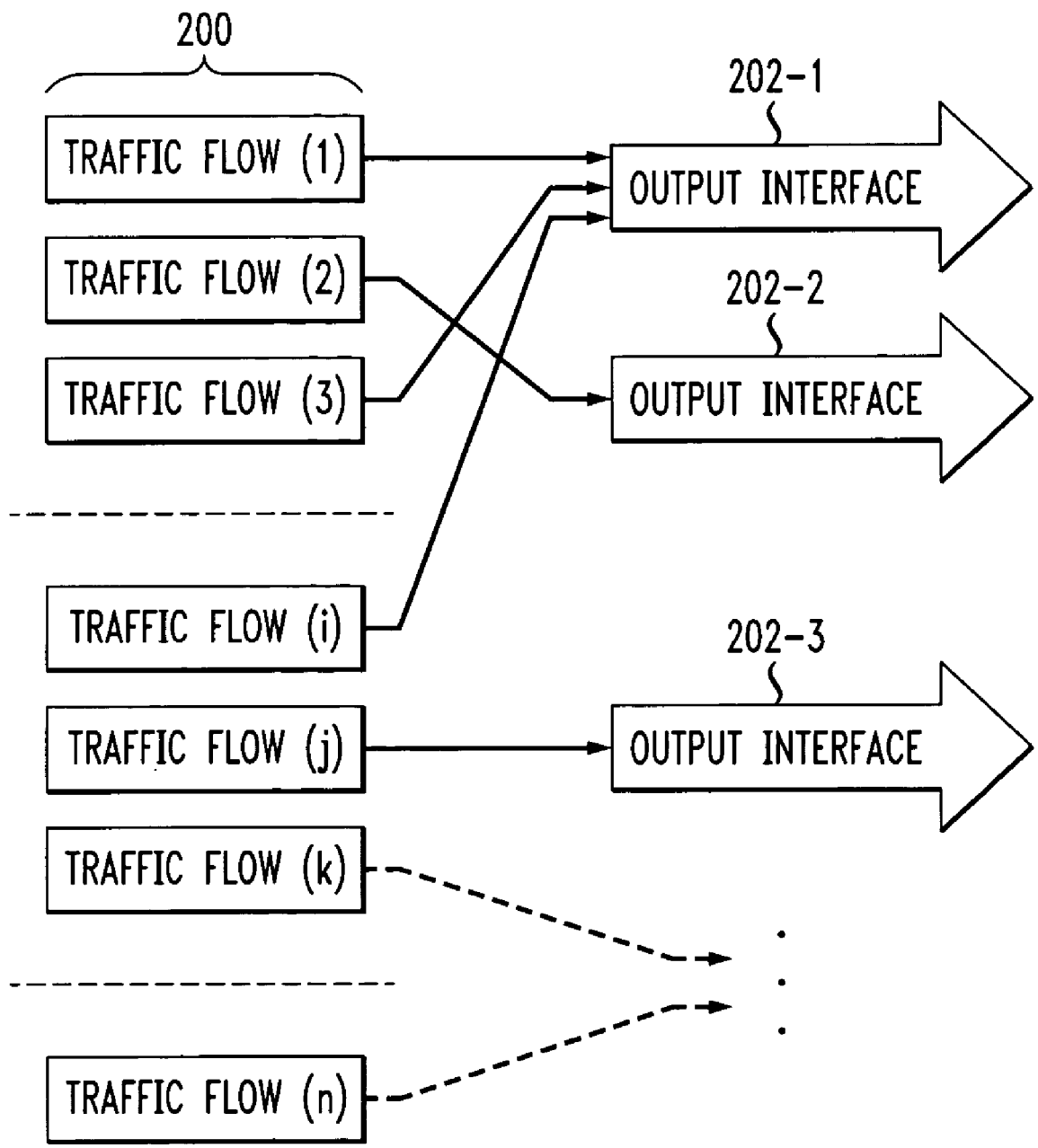
FIG. 2 illustrates the association of different traffic flows with corresponding output interfaces of the FIG. 1 traffic generator in accordance with the invention.

In accordance with an aspect of the invention, network traffic generated by the traffic generator 100 may be characterized by one or more traffic flows 200, as is illustrated generally in FIG. 2. More specifically, as shown in the figure, the traffic flows 200 include individual traffic flows denoted as Traffic Flow (1), Traffic Flow (2), Traffic Flow (3), . . . Traffic Flow (i), Traffic Flow (j), Traffic Flow (k), . . . Traffic Flow (n). The particular total number of flows n is purely arbitrary, and any number of flows may be supported in a given application.

One or more of the traffic flows may be associated with each of a number of output interfaces 202-1, 202-2 and 202-3. These output interfaces are associated with the output interface bus 106 of the traffic generator 100. Although only three such interfaces are shown in FIG. 2, any desired number of such interfaces may be supported in the traffic generator 100.

The term "output interface" as used herein is intended to include without limitation an output port, communication path, bus or other output connection associated with a traffic generator, and/or a software-based representation of any such connection.

The example arrangement in FIG. 2 shows Traffic Flow (1), Traffic Flow (3) and Traffic Flow (i) being associated with output interface 202-1, Traffic Flow (2) being associated with output interface 202-2, and Traffic Flow (j) being associated with output interface 202-3. Traffic Flow (k) and Traffic Flow (n) may both be associated with another output interface not specifically shown in the figure. In general, any of the flows 200 may be associated with any of the output interfaces, in any desired combination.

Each of the traffic flows 200 in the illustrative embodiment may be generated at least in part, by way of example, utilizing one or more protocol encapsulations, packet size and packet arrival time distribution models, traffic models, packet payload descriptions, or other traffic-characterizing information.

The protocol encapsulation feature allows one to generate a wide variety of different packet configurations utilizing one or more of the protocol models 124. Examples of protocol encapsulations utilizable in conjunction with the invention include IP-over-ATM, IP-over-Ethernet, IP-over-PPP, TCP-over-IP-over-AAL2-over-ATM, etc. Such encapsulations are utilizable in modeling the above-noted new classes of communication services, including multimedia, voice and video-on-demand.

Other types of protocol compositions, involving one or more of the protocol models 124, can be used. The protocol compositions can be configured in a generic manner, such that any protocol x can be composed over another protocol y.

The packet size distribution model feature allows one to specify, for example, packet sizes, and the number or duration of packets of a particular size. Exemplary packet size distribution models include a fixed size model, an explicit model, a uniform model, a Gaussian model, an autoregressive model, a variable bit rate model, a constant bit rate model, etc.

The packet arrival time distribution model feature allows one to specify, for example, a particular distribution, such as a Poisson distribution, for packet arrival times.

A size distribution and an arrival time distribution for the packets may be determined in the traffic manager 102 utilizing one or more of the distribution models 120. The timestamp generator 110, under the control of the timestamp manager 112, generates timestamps corresponding to the desired packet sizes and arrival times.

The traffic models 122 may be used to specify, for example, the "burstiness" of the data traffic. Such burstiness is commonly associated with network services such as delivery of compressed video or file transfer. Examples of traffic models include Poisson, Markov Modulated Poisson Process (MMPP), equal data rate, equal interval, deterministic burst, probabilistic burst, earned burst and compensatory burst traffic models.

Additional details regarding the compensatory burst model and other exemplary traffic models utilizable in the traffic generator 100 may be found in the above-cited U.S. patent application Ser. No. 10/620,258.

Multiple traffic models can be combined without loss of generality to model real-life network traffic. By way of example, scene changes associated with video traffic can be accurately modeled using MMPP. Video packet generation can therefore be modeled as a combination of two separate traffic flows, one simulating the scene changes based on MMPP and the other simulating packets of unchanged scenes.

The distribution, traffic and protocol models 120, 122 and 124 may be used in testing congestion control mechanisms, port scheduling, and other aspects of a given system.

The packet payload descriptions are useful in determining the accuracy of data transmission through the system. For example, such descriptions can be used to determine how closely received data corresponds to transmitted data.

The traffic generator 100 is configured to generate traffic flows based on various combinations of the above-described features. As indicated previously, such traffic flows may themselves be combined and delivered onto a single connection associated with a given output interface of the output interface bus 106. This advantageously allows a simulated or actual device, such as a simulated or actual network processor, to receive a wide variety of different types of user-configurable data traffic via the output interface.

It is also possible for the generated traffic to be stored in a traffic file associated with the traffic file memory 104. Such traffic files may be used, by way of example, to regenerate the corresponding traffic in a hardware traffic generator, or in conjunction with delivery of the corresponding traffic to a simulated or actual device. A detailed example of a traffic file format suitable for use in storing such traffic files will be described below with reference to FIG. 3.

In the traffic generator 100, user-customizable features may be processed in a standardized description language such as extensible mark-up language (XML). For example, an XML configuration specifying user-customizable features may be parsed in the traffic generator 100 and processed to construct an in-memory representation of the specified traffic parameters, which are used to synthesize the corresponding traffic.

The traffic generator 100 may thus be viewed, by way of example, as operating in at least two phases, namely a first phase in which a timestamp table is constructed based at least in part on the user-selected configuration features, and a second phase in which the actual packets are generated using the timestamp table constructed in the first phase. Construction of such a timestamp table from user-selected configuration features may be implemented in a straightforward manner, as will be apparent to those skilled in the art. Generally, such a timestamp table will preferably indicate particular packet sizes and the times at which such packets should be generated in order to provide the desired traffic output. It should be understood, however, that numerous other timestamp table configurations may be used.

The operation of the pattern generator 130 and sequencer 132 of the configurable elements 126 will now be described in greater detail.

The pattern generator 130 is preferably able to generate any desired number of values for a given configurable parameter. For example, IP addresses can be generated using the pattern generator 130. The pattern generator 130 may support one or more different pattern generation processes, including step generation, explicit generation and template mask generation. Each such pattern generation process may generate a corresponding list of values, also referred to herein as a configuration list. The configuration list may be associated with one or more sequencing processes of the sequencer 132.

A given sequencing process of the sequencer 132 is utilized to select a particular value from the configuration list. Examples of sequencing processes that may be supported by the sequencer 132 include round robin, random, weighted random, weighted indexed round robin, user-defined ordering, etc. Another example is a group sequencer, which allows correlation of two or more parameters having the same number of values in the configuration list. This provides a definitive mapping between different parameters.

The sequencer 132 can be used, for example, in conjunction with the generation of traffic designed to stress test scheduling algorithms associated with the provision of class of service or quality of service (QoS) performance in a given system.

Although not shown in FIG. 1, an appropriate system clock may be used to control the operations of the traffic generator 100, as will be appreciated by those skilled in the art.

As indicated previously, the traffic generator in a first phase of operation generates a timestamp table, and in a second phase of operation utilizes the timestamp table to generate the packets associated with the desired data traffic. The creation of the timestamp table in the first phase is implemented by the timestamp generator 110 and timestamp manager 112, utilizing the models 120, 122 and 124 and the configurable elements 126, including pattern generator 130 and sequencer 132. The generation of the packets based on the timestamp table is carried out using the PDU generator 114 operating in conjunction with the traffic supplier 116 and the event/subsystem forwarder 118.

It should be noted that a header correction operation may be performed prior to or in conjunction with the generation of the packets. For example, such header correction may involve the inclusion of additional bits to accommodate the particular protocol(s) being used. Transmission timestamps, indicating the actual transmission time of packets to the output interface bus 106, may be adjusted to take into account any header correction operation that is performed.

The output interface bus 106 may be implemented, for example, as an abstracted Java or C module that represents one or more physical buses or other connections.

Each of the traffic flows generated in the traffic generator 100 preferably maps to at least two interfaces, namely an output interface and an input interface. The mapping of traffic flows 200 to output interfaces 202 was previously described in conjunction with FIG. 2. Generally, an output interface is used to send packets out of the traffic generator, while an input interface is used to receive packets into the traffic generator. Any such received packets may be processed by the event subsystem/forwarder 118, which determines the corresponding protocol and forwards them to the appropriate traffic generator element for further processing. The input interfaces are not explicitly shown in the simplified block diagram of FIG. 1, but may be otherwise configured in a manner similar to that used for such interfaces in conventional traffic generators.

As indicated previously, the traffic generator 100 may be implemented on or as a processor-based information processing device. A user interface may be provided, using XML or other suitable formatting language, to allow the user to control the various selectable parameters or other features of the traffic generator. The models 120, 122, 124 and configurable elements 126 may be represented as a hierarchical list of elements and associated attributes. The particular selected values may be validated at run time, and an in-memory representation of the configuration may then be generated for use by the traffic manager 102.

An example format for a given traffic file in the traffic generator 100 will now be described with reference to FIGS. 3A, 3B and 3C.

With reference initially to FIG. 3A, the traffic file in this example is represented as a string which includes a global header followed by one or more frames each having an associated frame header. The frames contain the actual data of the packet(s) to be generated, while the corresponding frame headers contain accessory information that allows the traffic file to be read and the frames extracted and sent at the appropriate time over the appropriate connection or other interface.

FIG. 3B shows the structure of the global header in this example. The global header size is 32 bytes. The Type field is a one-byte field specifying one of a number of different possible traffic descriptions. For example, if the Type field has a particular value, such as three, this may be used to indicate that the traffic description is configured in accordance with a particular traffic generator version or format. The Clock Speed field is eight bytes in length, and specifies an integer value indicating the clock rate of the physical line connection or other output interface for which the traffic is generated. The Reserved field is 23 bytes in length.

FIG. 3C shows the structure of the frame header in this example. Each of the frame headers in a given traffic file is configured in this manner. The frame header size is 14 bytes. The Flow ID field is a one-byte field which identifies the particular traffic flow(s) associated with the corresponding frame. In a situation in which multiple traffic flows are to be associated with a single output interface, the information in the Flow ID field may be used to control the mapping between the flows and the output interface. The Delta field is eight bytes in length, and indicates the time gap in clock cycles between the current frame and the previous frame. For the first frame header, the Delta field may indicate the number of cycles, measured from the start of a simulation or other traffic generation process, after which the first frame is to be sent over the output interface. The Length field is four bytes in length, and indicates the length of the corresponding frame. The length field is useful in extracting an amount of data exactly equal to the frame and subsequently the next frame header. The Reserved field is a one-byte field.

Traffic files in the format described above may be generated by the traffic manager 102 and stored in the traffic file memory 104 of the traffic generator 100. Of course, this particular traffic file format is merely one illustrative example of a traffic file format suitable for use in the traffic generator 100.

A given traffic file generated in accordance with the invention can be utilized by the traffic generator 100 in providing the corresponding traffic for delivery over the output interface bus 106. Alternatively, the traffic file can be utilized by another traffic generator, such as a hardware traffic generator, in providing the corresponding traffic. Such hardware traffic generators may comprise, for example, application-specific integrated circuits or other types of integrated circuits configured to read the traffic file and to generate the corresponding packets.

As indicated above, the present invention in the illustrative embodiment provides a traffic generator having a high degree of configuration flexibility, thereby overcoming the drawbacks associated with conventional traffic generators. Advantageously, the traffic generator 100 avoids the need for multiple customized traffic generators or the construction of elaborate prototypes, thereby considerably reducing the costs associated with communication system design testing and other traffic generation applications. The traffic file format aspects of the invention eliminate the need for replacement of hardware traffic generators as distribution, traffic and protocol models change over time.

It is to be appreciated that, although described in the context of network traffic arrival, the techniques of the invention can be applied to a wide variety of other traffic generation applications. Also, the invention does not require the use of packet-based traffic or any other particular data traffic format.

As mentioned previously, one or more software programs for implementing the traffic generation functionality described herein may be stored in a memory of an information processing device and executed by a processor of that device.

It should again be emphasized that the above-described embodiment is intended to be illustrative only. For example, alternative embodiments may be configured which utilize different traffic generator modules, elements, configurations, models, parameters, or processing operations than those specifically described herein.

These and numerous other alternative embodiments within the scope of the following claims will be apparent to those skilled in the art.

What is claimed is:

1. A method of generating data traffic in a traffic generator, the method comprising the steps of:
    generating a plurality of traffic flows; and
    associating each of the traffic flows with at least one of a plurality of output interfaces of the traffic generator such that at least two of the plurality of output interfaces each has one or more of the traffic flows associated therewith and at least one of the plurality of output interfaces has two or more of the traffic flows associated therewith;

the traffic flows comprising respective test traffic flows synthesized within the traffic generator.

2. The method of claim 1 wherein at least one of the traffic flows is generated based on user selection of at least one of a protocol encapsulation, a packet size distribution model, a packet arrival time distribution model, a traffic model, and a packet payload description.

3. The method of claim 1 wherein the output interfaces are associated with an output interface bus of the traffic generator.

4. The method of claim 3 wherein the output interface bus is implemented as a software module representative of one or more physical connections.

5. The method of claim 1 wherein each of the plurality of traffic flows maps to one of the output interfaces of the traffic generator and to an input interface of the traffic generator.

6. The method of claim 1 wherein the traffic generator is operable in at least two phases, including a first phase in which a timestamp table is constructed based at least in part on user-selected configuration information, and a second phase in which packets are generated using the timestamp table constructed in the first phase.

7. The method of claim 1 wherein the traffic generator comprises a pattern generator having a plurality of user-selectable pattern generation processes associated therewith, at least a given one of the processes generating a configuration list.

8. The method of claim 1 wherein the traffic generator comprises a sequencer having a plurality of user-selectable sequencing processes associated therewith, a given one of the sequencing processes specifying an order of selection of items from a configuration list.

9. The method of claim 8 wherein the plurality of sequencing processes comprises a group sequencer which provides a correlative mapping between two or more configuration lists and their associated parameters.

10. The method of claim 1 wherein information characterizing one or more of the traffic flows is stored as a traffic file in a memory associated with the traffic generator.

11. The method of claim 10 wherein the traffic file is represented as a string which includes a global header followed by one or more frames each having an associated frame header.

12. The method of claim 11 wherein the global header comprises a type field indicating a type of traffic description used, and a clock speed field indicating a clock speed of the associated output interface.

13. The method of claim 11 wherein a given one of the frame headers comprises a flow identification field which identifies one or more traffic flows associated with the corresponding frame, a timing field indicating a time gap in clock cycles between the corresponding frame and a previous frame, and a length field indicating the length of the corresponding frame.

14. The method of claim 1 wherein the traffic generator comprises a hardware traffic generator.

15. The method of claim 1 wherein the traffic generator comprises a software traffic generator.

16. The method of claim 1 wherein the traffic generator comprises an element of a software-based development tool for simulating the operation of an electronic system.

17. The method of claim 1 wherein the traffic generator is implemented primarily in software and is configured to generate data traffic files that are utilizable in another traffic generator implemented primarily in hardware.

18. An apparatus for generating data traffic, the apparatus comprising an information processing device having a processor and a memory, the information processing device implementing a traffic generator operative:

to generate a plurality of traffic flows; and to associate each of the traffic flows with at least one of a plurality of output interfaces of the traffic generator such that at least two of the plurality of output interfaces each has one or more of the traffic flows associated therewith and at least one of the plurality of output interfaces has two or more of the traffic flows associated therewith;

the traffic flows comprising respective test traffic flows synthesized within the traffic generator.

19. An article of manufacture comprising a computer-readable medium encoded with computer executable instructions for use in generating data traffic in a traffic generator, which when executed implement the steps of:

generating a plurality of traffic flows; and associating each of the traffic flows with at least one of a plurality of output interfaces of the traffic generator such that at least two of the plurality of output interfaces each has one or more of the traffic flows associated therewith and at least one of the plurality of output interfaces has two or more of the traffic flows associated therewith;

the traffic flows comprising respective test traffic flows synthesized within the traffic generator.

* * * * *